Figures 1, 2, 3, 4, 5, 6:
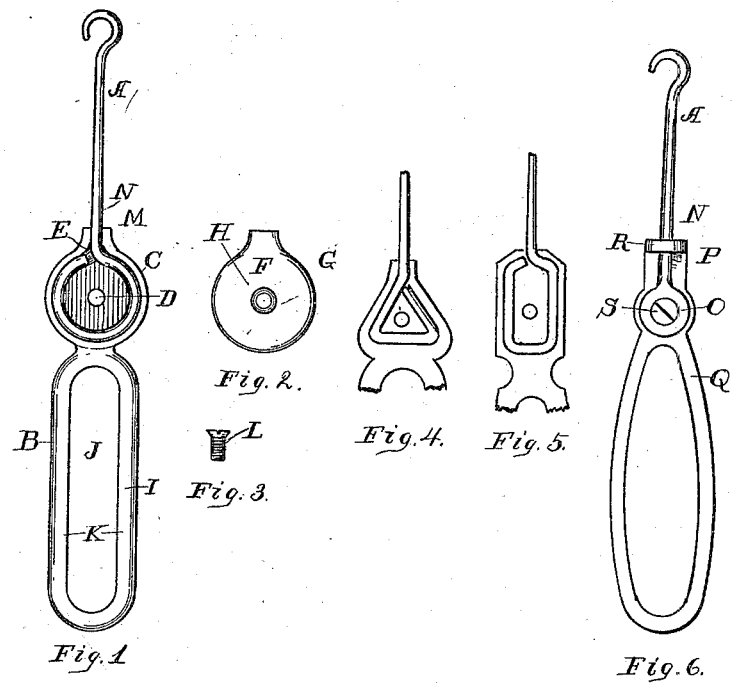

(No Model.)

J., T. H. & C. A. FYE.
BUTTON HOOK HOLDER.

No. 301,053. Patented June 24, 1884.

WITNESSES:  INVENTORS: John Fye, Theodore H. Fye, Charles A. Fye
By Attorney.

UNITED STATES PATENT OFFICE.

JOHN FYE, THEODORE H. FYE, AND CHARLES A. FYE, OF ZANESVILLE, OHIO, ASSIGNORS TO JOHN FYE & SONS, OF SAME PLACE.

BUTTON-HOOK HOLDER.

SPECIFICATION forming part of Letters Patent No. 301,053, dated June 24, 1884.

Application filed January 28, 1884. (No model.)

*To all whom it may concern:*

Be it known that we, JOHN FYE, THEODORE H. FYE, and CHARLES A. FYE, of Zanesville, in the county of Muskingum and State of Ohio, have invented a new and useful Improvement in Button-Hook Holders, which improvement is fully set forth in the following specification and accompanying drawings, in which—

Figure 1 is a plan view of our improved adjustable button-hook holder. Fig. 2 is a top view of the cap; Fig. 3, a side view of the screw; Figs. 4 and 5, plan views of modified forms of the part of the hook connecting with the handle. Fig. 6 is a plan view of a different method of connecting the hook and handle.

The present invention relates to an improvement in shoe-buttoners, in which to an ordinary button-hook we attach a handle arranged with a circular, triangular, oblong, or other shaped groove, within which the handle of an ordinary hook is placed and secured in position by means of a cap and screw. The handle thus attached to the hook we arrange in such a manner that the advertising-matter can be placed thereon, all of which will now be fully set forth in detail.

In the drawings, A is a form of hook in general use. A handle, B, is provided formed of tin, brass, or any suitable material, one end having a broad flattened part, C, nearly circular in form. A screw-threaded opening, D, is placed in the center, while just within the rim is placed a circular depression, E, the same size as the circular handle of the hook A. A plate or cap, F, of the same size, and formed of the same or other material as the handle B, and having a circular groove, G, corresponding with the groove E, while the center is provided with a circular countersunk opening, H, to correspond with the opening in the circular part of the handle, is placed thereon. The part B of the handle is formed oblong, and of sufficient length to hold conveniently in the hand, with its central part cut away, forming an oblong slot, J. The sides K are somewhat flattened, and upon which advertising-matter may be placed; or a fine plate, adjustable or otherwise, for a like purpose may be inserted in the center of this oval handle. The circular part of the hook A is placed in the groove of the handle, and the cap F placed thereon and secured in position by means of the screw L. The end M of the handle extends forward somewhat, forming a neck, and the opening therein is designed to be of sufficient size to permit the shank N of the hook to rest therein without having a lateral movement.

Fig. 4 shows a modified form of Fig. 1, in which the handle of the ordinary hook is formed in a triangular shape, and the forward end of the handle attached thereto made to conform therewith. I do not, however, confine myself to any special form for the connecting parts, as it is obvious that they may be formed oblong, as shown in Fig. 5, or in any other manner desired.

Fig. 6 is a modified form of Fig. 1, in which the hook and shank N are similar to Fig. 1, while the end O is somewhat flattened and provided with a countersink opening, while the end P of the handle Q is somewhat elongated, and with an opening, T, while the end R is turned up at right angles, and has an opening therein sufficiently large to receive the shank N of the buttoner. The shank is placed through this opening and the rear end secured to the handle by means of a screw, S.

It is obvious that by arranging the handle in this manner it can be placed in any position without the liability of its rolling away, and also its greater size over the ordinary hook permits of its being manipulated with greater ease; or it can be hung up flat against the wall, while at the same time advertising-matter placed on the handle will always be in a conspicuous position.

What we claim is—

The combination, in a button-hook holder, of a handle, one end slotted through the center, the sides somewhat flattened and arranged for placing advertising-matter thereon, the other end provided with a circular groove and cap having a corresponding groove, and secured in position by means of a screw, with a button-hook, one end formed with a curved part and arranged to fit in the circular groove of the handle, substantially as herein set forth.

In testimony that we claim the foregoing we have hereunto set our hands this 18th day of January, 1884, in the presence of witnesses.

JOHN FYE.
THEODORE H. FYE.
CHARLES A. FYE.

Witnesses:
GEORGE L. PHILLIPS,
JOHN B. HUNTER.